United States Patent
Yamamoto et al.

(10) Patent No.: US 8,161,657 B2
(45) Date of Patent: Apr. 24, 2012

(54) MEASURING FORCE CONTROL APPARATUS

(75) Inventors: Takeshi Yamamoto, Kanagawa (JP); Atsushi Shimaoka, Kanagawa (JP)

(73) Assignee: Mitutoyo Corporation, Kawasaki-shi (JP)

( * ) Notice: Subject to any disclaimer, the term of this patent is extended or adjusted under 35 U.S.C. 154(b) by 48 days.

(21) Appl. No.: 12/909,293

(22) Filed: Oct. 21, 2010

(65) Prior Publication Data

US 2011/0088273 A1    Apr. 21, 2011

(30) Foreign Application Priority Data

Oct. 21, 2009   (JP) ................ 2009-242384

(51) Int. Cl.
*G01B 7/28* (2006.01)
(52) U.S. Cl. ............................. 33/561; 33/554
(58) Field of Classification Search ............. 33/561, 33/503, 549, 550, 551–556, 558, 559
See application file for complete search history.

(56) References Cited

U.S. PATENT DOCUMENTS

| | | | | |
|---|---|---|---|---|
| 4,074,438 A * | 2/1978 | Takeda | ........................ | 33/561 |
| 4,141,148 A * | 2/1979 | Noguchi | ........................ | 33/561 |
| 4,389,786 A * | 6/1983 | Sakata et al. | ............... | 33/561 |
| 4,669,300 A * | 6/1987 | Hall et al. | .................. | 73/105 |
| 4,807,152 A * | 2/1989 | Lane et al. | ................ | 700/247 |
| 5,146,690 A * | 9/1992 | Breitmeier | .................. | 33/551 |
| 5,926,781 A * | 7/1999 | Scott | ........................ | 702/151 |
| 6,209,217 B1* | 4/2001 | Tsuruta et al. | ............. | 33/554 |
| 6,314,800 B1* | 11/2001 | Nishimura | ................ | 73/105 |
| 6,874,243 B2* | 4/2005 | Hama et al. | ................ | 33/551 |
| 7,290,348 B2* | 11/2007 | Katamachi | ................ | 33/550 |
| 7,950,164 B2* | 5/2011 | Nakayama et al. | .......... | 33/556 |
| 2004/0168332 A1* | 9/2004 | Hama et al. | ................ | 33/551 |

FOREIGN PATENT DOCUMENTS

JP      5-340706      12/1993

* cited by examiner

*Primary Examiner* — Christopher Fulton
(74) *Attorney, Agent, or Firm* — Rankin, Hill & Clark LLP

(57) ABSTRACT

A position controller provided in a controlling module obtains a difference between a detected rotation angle of a stylus and a target rotation angle, and determines an energization amount to a voice coil motor so that the difference becomes zero. A variable limiter circuit limits a driving current, which is supplied from the position controller, to a limitation value so that a rotation force applied to the stylus from the voice coil motor is constant. A target rotation angle issuing portion switches over the target rotation angle based on a relative position of a contact portion of the stylus.

5 Claims, 10 Drawing Sheets

MEASURING FORCE CONTROL APPARATUS

TECHNICAL FIELD

The present invention relates to a measuring force control function of, in a surface texture measuring apparatus such as a roundness measuring apparatus, a contour measuring apparatus, and a roughness measuring apparatus, controlling a measuring force which is caused to act on the surface of an object to be measured by pushing the object to be measured with a contact stylus.

RELATED ART

In a usual roundness measuring apparatus, an object to be measured is placed on a rotary table, and the rotary table is rotated while the surface position of the object to be measured is detected by a contact stylus, so that data of the surface position of the object to be measured are accumulated, thereby measuring and calculating the roundness.

For example, Patent Reference 1 discloses an apparatus which controls the measuring force in an apparatus for measuring the surface shape of an object to be measured by using a contact stylus, so as to be constant.

As shown in FIG. 10, the measuring force control apparatus disclosed in Patent Reference 1 includes: a stylus 102 in which a contact portion 101 to be contacted with the object to be measured W is disposed in the tip end; a stylus holder 104 which rotatably supports the stylus 102 while using a fulcrum member 103 as a fulcrum; a spring 105 which couples the stylus 102 with the stylus holder 104; a differential transformer 106 which detects a rotation angle of the stylus 102, thereby detecting the surface position of the object to be measured W; a voice coil motor 107 which applies a rotation force about the fulcrum to the stylus 102 in accordance with the energization amount; and a controlling module 108 for controlling the energization amount of the voice coil motor 107.

Although not illustrated, in the case where the measuring force control apparatus is used as a roundness measuring apparatus, the apparatus further includes: a rotary table which rotates the object to be measured W; a slider device which reciprocates the stylus holder 104 toward and from the object to be measured W on the rotary table; and a relative position detecting module for detecting the relative position between the stylus holder 104 and the object to be measured.

In the measurement, first, the slider device is operated to cause the stylus holder 104 to approach the object to be measured W, and a state where the contact portion 101 is pressed against the object to be measured W is set. The stylus 102 rotates about the fulcrum in accordance with the pressing amount of the contact portion 101, and therefore a reaction force of the spring 105 which is proportional to a rotation amount is applied to the stylus 102, thereby producing a force by which the contact portion 101 is caused to press the object to be measured W. The force is called the measuring force F which acts on the surface of the object to be measured.

Then, the rotary table is operated to relatively move the object to be measured W with respect to the stylus holder 104, and the contact portion 101 is guided along the surface of the object to be measured. When the contact portion 101 is displaced in accordance with the surface shape, the stylus 102 swings about the fulcrum. Therefore, the surface position of the object to be measured W is detected by the differential transformer 106. The rotary table and the slider device function as a module for relatively moving the object to be measured W and the stylus holder 104. Alternatively, the module may be configured by using another movable table and slider device.

In the type in which the measuring force F is produced by using the reaction force of the spring 105 which is proportional to the rotation amount of the stylus 102, the deformation amount of the spring 105 is varied in accordance with the swinging of the stylus 102 about the fulcrum, and the measuring force F is changed. In order to produce the constant measuring force F even when the stylus 102 swings and its rotation angle is varied, therefore, the voice coil motor 107 which applies the rotation force about the fulcrum to the stylus 102 in accordance with the energization amount is disposed in the apparatus of Patent Reference 1.

The controlling module 108 for controlling the energization amount of the voice coil motor 107 obtains the variation amount of the rotation angle due to the swinging of the stylus 102 during measurement, from the detection value of the differential transformer 106, and supplies a current which is proportional to the variation amount, i.e., that which causes the voice coil motor to produce a rotation force corresponding to the change amount of the measuring force, to the voice coil motor 107. As a result, the rotation force of the voice coil motor 107 is applied to the stylus 102, and the reaction produced by variation of the deformation amount of the spring 105 is offset. Therefore, the measuring force F which is constant irrespective of variation of the rotation angle of the stylus 102 is produced.

[Patent Reference 1] JP-A-5-340706

Case Where Cutout (Recess) or The Like Exists in Middle of Measurement Path

Usually, a measurement execution path where measurement is to be executed is set in the surface of the object to be measured, and the contact portion of the stylus is guided along the measurement execution path in a state where the contact portion is in contact with the object to be measured. Namely, measurement is executed while the stylus holder is relatively moved with respect to the object to be measured in the state where the contact portion of the stylus is in contact with the object to be measured.

In a case where a cutout, particularly, a cutout (recess) or the like in which an edge is raised exists in the middle of a measurement execution path that is set in the surface of the object to be measured, a constant rotation force is applied to the stylus 102 in the measuring force control apparatus of FIG. 10, irrespective of the rotation amount of the stylus. When the contact portion 101 of the stylus 102 is guided to the cutout portion, therefore, the contact portion 101 falls down into the cutout portion, and is caught by the edge portion of the cutout. When the rotation of the rotary table is continued unawares of the above, the stylus 102 may be broken.

Therefore, the following method is inevitably employed. Namely, execution of the measurement program is stopped before the contact portion of the stylus is guided to the cutout portion, the stylus is manually fixed so that the contact portion of the stylus does not fall down into the cutout portion, and then the rotary table is rotated. When the cutout portion thereafter passes over and the contact portion of the stylus reaches the next measurement starting position, the fixation of the stylus is cancelled, and the measurement program is restarted.

In the case where a shape which causes continuous measurement to be hardly performed, and which is typified by a cutout (recess) or the like exists in the middle of a successive measurement path as described above, execution of the measurement is automatically interrupted, and the contact portion of the stylus must be positioned to the next measurement starting position, so that continuous measurement is hardly performed on the successive measurement path. Therefore, it is first strongly requested to perform the continuous measurement without interrupting execution of a measurement program along a successive measurement path including a shape such as a cutout (recess) in the middle Measurement of Inner Surface of Small-Diameter Hole In the case where the inner surface of a small-diameter hole formed in the outer circumference of an object to be measured is to be measured, operations of inserting a stylus into the small-diameter hole, and positioning the stylus to the measurement starting position are performed before starting the measurement. In the insertion operation, in order to avoid a shaft portion of the stylus from being contacted with the inner surface of the object to be measured to damage the stylus, procedures of making the longitudinal center axis of the stylus parallel to the center axis of the small-diameter hole, and then inserting the stylus into the small-diameter hole are required.

In a rotary stylus, a reaction force of a spring is produced, or, in the apparatus of FIG. 10, the rotation force of the voice coil motor 107 is applied irrespective of the rotation amount of the stylus 102. In a state where the contact portion 101 of the stylus 102 is not in contact with the object to be measured W, therefore, the stylus 102 is held at a certain rotation angle. Because of the structural restriction, usually, the stylus 102 is held in a state where the stylus 102 rotates to the rotation limit. In the apparatus of FIG. 10, therefore, the rotation angle at which the stylus 102 is held is a constant angle.

In order to make the longitudinal center axis of the stylus parallel to the center axis of the small-diameter hole of the object to be measured, therefore, works of detaching the stylus holder itself, and again attaching the holder so that the longitudinal center axis of the stylus is made parallel to the center axis of the small-diameter hole are necessary. Alternatively, in a state where the axis of the stylus remains to be unparallel to that of the small-diameter hole, the stylus holder is moved toward the small-diameter hole, and the contact portion of the stylus is shallowly inserted into the small-diameter hole. In this state, the stylus holder is moved along the surface of the object to be measured, and the contact portion is made contact with the inner surface. In the contacted state, the stylus is further moved to attain a state where the axis of the stylus is parallel to that of the small-diameter hole. As described above, the complicated works of making the axis of the stylus made parallel to that of the small-diameter hole, and thereafter setting the contact portion of the stylus to a certain depth are required. In any case, if the rotation angle at which the stylus is held in a state where the stylus is not contacted with the object to be measured can be changed to an arbitrary rotation angle, these works can be omitted.

Therefore, second, also a request for, in order to facilitate the work of inserting the stylus into the small-diameter hole of the object to be measured, enabling the rotation angle at which the stylus is held in the state where the stylus is not contacted with the object to be measured, to be changed is strongly requested.

Even in measurements on the same object to be measured, the set value of the measuring force in the case where the roundness is to be measured may be sometimes different from that in the case where the roughness is to be measured. In the measuring force control apparatus of FIG. 10, the measuring force F is simply made constant, and cannot be changed. In the case where the set value of the measuring force F must be changed in accordance with the measurement item such as the roundness or the roughness, therefore, the measuring force control apparatus must be replaced with another one.

Because of the same reason, in the case where measurements of the roundness and the roughness are continuously performed on the identical object to be measured, execution of the measurement must be interrupted, and the measuring force control apparatus must be replaced with another one. With respect to measurement conditions, in addition to conditions of the measurement item such as the roundness or the roughness, also in conditions of the material of the object to be measured, there is a case where the set value of the measuring force must be changed. Furthermore, there is a case where, in order to reduce deformation of the object to be measured, the measuring force is to be reduced.

Therefore, third, a function of enabling the measuring force to be changed in accordance with a change of measurement conditions is strongly requested.

SUMMARY

Exemplary embodiments of the present invention provide a measuring force control apparatus which can control the measuring force so that the measuring force is produced or is not produced, and can change the measuring force.

A measuring force control apparatus, according to an exemplary embodiment, which controls a measuring force that is caused to act on a surface of an object to be measured by pushing the object to be measured with a contact portion of a stylus, comprises:

the stylus having the contact portion at a tip end, the contact portion being to be contacted with the object to be measured;

a stylus holder configured to hold the stylus in a state that the stylus can rotate about a fulcrum member as a fulcrum;

a rotation angle detecting module configured to detect a rotation angle of the stylus;

an electromagnetic driving module configured to apply a rotation force about the fulcrum to the stylus in accordance with an energization amount; and a controlling module configured to control the energization amount which is to be given to the electromagnetic driving module, wherein the controlling module has:

a target rotation angle issuing portion configured to set a target rotation angle of the stylus, an energization amount determining portion configured to obtain a difference between the detected rotation angle of the stylus and the target rotation angle, and to determine the energization amount which is to be given to the electromagnetic driving module so that the difference becomes zero, a limitation value issuing portion configured to set a limitation value for making constant the energization amount which is to be given to the electromagnetic driving module, and an energization amount limiting portion configured to, when the difference between the detected rotation angle of the stylus and the target rotation angle is equal to or larger than a certain angle, limit the energization amount that is determined by the energization amount determining portion, to the limitation value, thereby causing a constant measuring force to be produced.

In a case where a constant measuring force is to be produced, the target rotation angle issuing portion is configured to set the target rotation angle within a range where the rotation of the stylus is restricted by the contact between a measurement position of a surface of the object to be measured and the contact portion of the stylus, and the difference between the detected rotation angle of the stylus and the target rotation angle is equal to or larger than the certain angle, and in a case where the stylus is to be held while the measuring force is not to be produced, the target rotation angle issuing portion is configured to set the target rotation angle within a range where the stylus is not subjected to rotation restriction caused by the contact between the object to be measured and the contact portion of the stylus.

The functions and effects of the measuring force control apparatus of the embodiment will be described.

The energization amount determining portion obtains the difference between the currently detected rotation angle of the stylus and the target rotation angle, and determines the energization amount to be given to the electromagnetic driving module so that the difference becomes zero. Therefore, the rotation force of the electromagnetic driving module which corresponds to the energization amount is given to the stylus, and the rotation angle of the stylus is feedback controlled so as to always approach the target rotation angle.

In the invention, as required, the target rotation angle issuing portion switches over the setting of the target rotation angle which is the target of the feedback control.

Generation of Measuring Force

In a state where the contact portion of the stylus is in contact with the measurement position of the surface of the object to be measured, when the measuring force is to be produced, for example, the target rotation angle may be set so that the target position of the contact portion of the stylus is inside the object to be measured. Since the rotation of the stylus is restricted by the contact, a state where a difference between the detected rotation angle of the stylus and the target rotation angle always exists. Therefore, the state where the rotation force is given to the stylus is maintained, and the measuring force can be always produced.

180-Degree Inversion of Direction of Measuring Force

For example, there is a case where the direction in which the measuring force acts is to be changed from the clockwise direction about the fulcrum of the stylus to the counterclockwise direction. When the target rotation angle of the stylus is set so that the target position of the contact portion of the stylus is shifted in the clockwise direction about the fulcrum of the stylus from the current position of the contact portion of the stylus, the measuring force acts in the clockwise direction. Conversely, when the target rotation angle of the stylus is set so that the target position of the contact portion of the stylus is shifted in the counterclockwise direction about the fulcrum of the stylus from the current position of the contact portion of the stylus, the measuring force acts in the counterclockwise direction. As described above, when the set value of the target rotation angle of the stylus is switched, it is possible to easily switch over the direction in which the measuring force acts.

Holding of Stylus in Contact State

In a case where, for example, the stylus is to be held while the measuring force is set to zero, in the state where the contact portion of the stylus is in contact with the measurement position of the surface of the object to be measured, the target rotation angle of the stylus may be made coincident with the currently detected rotation angle of the stylus. Namely, when the target rotation angle is set to the rotation angle of the stylus at which the difference between the rotation angle of the stylus and the target rotation angle becomes zero, it is possible to hold the stylus at the rotation angle.

Holding of Stylus at Arbitrary Rotation Angle

Alternatively, the target rotation angle of the stylus may be set so that the target position of the contact portion of the stylus is a position where the contact portion is not in contact with the measurement position of the surface of the object to be measured. Namely, the target rotation angle is set within the range where the stylus is not subjected to rotation restriction caused by the contact between the object to be measured and the contact portion of the stylus, whereby the stylus is allowed to rotate to the target rotation angle without being subjected to rotation restriction caused by the contact. Therefore, it is possible to hold the stylus at the target rotation angle.

In the invention, as described above, in the case where a constant measuring force is to be produced, the target rotation angle issuing portion sets the target rotation angle within the range where the rotation of the stylus is restricted by the contact between the measurement position of the surface of the object to be measured and the contact portion of the stylus, and the difference between the detected rotation angle of the stylus and the target rotation angle always exists, and, in the case where the stylus is to be held while the measuring force is not produced, the target rotation angle is set within the range where the stylus is not subjected to rotation restriction caused by the contact between the object to be measured and the contact portion of the stylus.

When, as required, the target rotation angle issuing portion switches over the setting of the target rotation angle, therefore, it is possible both to produce the measuring force, and to hold the stylus at a certain rotation angle while the measuring force is not produced.

Even in the case where the successive measurement path includes both a path where the measuring force must be produced, and a path where the stylus must be held at a certain rotation angle while the measuring force is not produced, when the target rotation angle issuing portion switches over the setting of the target rotation angle, therefore, the target rotation angle issuing portion switches over the setting of the target rotation angle, the successive measurement path can be subjected to continuous measurement without interrupting execution of a measurement program.

In the case where the stylus is held, when the target rotation angle issuing portion sets the target rotation angle to an arbitrary rotation angle in the range where the stylus is not subjected to rotation restriction caused by the contact between the object to be measured and the contact portion of the stylus, the rotation angle at which the stylus is held is not limited to one value, but can be changed.

Constant Measuring Force

In the case where only the determination of the energization amount to be given to the electromagnetic driving module so that the difference between the detected rotation angle of the stylus and the target rotation angle becomes zero is performed, when the difference is varied, the energization amount may be changed, and it is impossible to produce a constant measuring force. In the invention, in order to produce a constant measuring force and allow the measuring force to be changed in accordance with the measurement conditions, the controlling module for controlling the energization amount of the electromagnetic driving module includes: the limitation value issuing portion in which a limitation value for making the energization amount constant can be set; and the energization amount limiting portion which, when the difference between the detected rotation angle of the stylus and the target rotation angle is equal to or larger than a certain angle, limits the energization amount to the limitation value, thereby causing a constant measuring force to be produced. When the difference is always equal to or larger than the certain angle, the energization amount is limited to the limitation value, and a constant measuring force can be continued to be produced.

When the condition that the target rotation angle is within the range where the difference between the detected rotation angle of the stylus and the target rotation angle is equal to or larger than a certain angle is added to the set conditions of the target rotation angle, therefore, it is possible to produce a constant measuring force.

In actual measurement, when the contact portion of the stylus is guided along the successive measurement path, the position of the contact portion is varied in accordance with the surface shape. Based on the detected value of the rotation angle of the stylus which is varied in accordance with the variation of the position of the contact portion, therefore, the surface position of the object to be measured is detected. In the setting in which the target rotation angle issuing portion sets the target rotation angle of the stylus, therefore, the target rotation angle of the stylus may be set so that the difference between the above-described rotation angle of the stylus and the target rotation angle is equal to or larger than a certain angle, with reference to the position of the contact portion where the displacement amount is larger than that at the position where the contact portion of the stylus is displaced at the largest degree in the direction along which the measuring force acts. When the target rotation angle is set in this manner, a constant measuring force can be produced irrespective of variation of the rotation angle of the stylus which is being measured.

Change of Measuring Force

Since the limitation value issuing portion can arbitrarily set the limitation value of the energization amount, the magnitude of the measuring force can be easily changed simply by changing the limitation value.

The measuring force control apparatus according to the exemplary embodiment, further comprise:

a relative moving module configured to relatively move the stylus holder and the object to be measured; and a relative position detecting module configured to detect a relative position of the stylus holder and the object to be measured, wherein the controlling module comprises a contact portion position calculating portion configured to calculate a relative position of the contact portion of the stylus with respect to the object to be measured, on a basis of the detected relative position of the stylus holder and the object to be measured, and the detected rotation angle of the stylus, and, wherein the target rotation angle issuing portion is configured to change a setting of the target rotation angle on a basis of the relative position of the contact portion of the stylus with respect to the object to be measured.

In a case where a successive measurement path is successively measured, the successive measurement path being previously set on an outer circumferential face of the object to be measured and including successively a first measurement executing path in which the measurement is to be executed, a positioning path in which the measurement is to be interrupted and a second measurement executing path in which the measurement is to be executed, the target rotation angle issuing portion is configured to set the target rotation angle within a range where the difference between the detected rotation angle of the stylus and the target rotation angle is equal to or larger than the certain angle, thereby causing the constant measuring force to be produced, during executing the measurement of the first measurement executing path, the target rotation angle issuing portion is configured to set the target rotation angle to coincide with the rotation angle of the stylus which is detected at a measurement interrupting position or to coincide with a value which is stable and most appropriate for restarting of the measurement of the second measurement executing path, when the contact portion of the stylus reaches the measurement interrupting position of the first measurement executing path, and, the target rotation angle issuing portion is configured to set the target rotation angle within the range where the difference between the detected rotation angle of the stylus and the target rotation angle is equal to or larger than the certain angle, when the contact portion of the stylus reaches a measurement restarting position of the second measurement execution path.

Case Where Positioning Path Exists in Middle of Successive Measurement Path

In the case where a shape which causes continuous measurement to be hardly performed, and which is typified by a cutout (recess) or the like exists in the middle of a successive measurement path, such a path is usually set as a positioning path, and the successive measurement path is configured by a sequence of a front (first) measurement execution path, the positioning path, and a rear (second) measurement execution path.

In the front and rear measurement execution paths, a constant measuring force must be produced, and, in the positioning path, the stylus must be held while the measuring force is not produced.

On the other hand, the relative position of the contact portion of the stylus is detected by the detecting module. Therefore, the timing when the contact portion reaches the measurement interrupting position of the front measurement execution path, and that when the contact portion is positioned and reaches a measurement restarting position of the rear measurement execution path can be easily distinguished from each other.

In the invention, in accordance with the relative position of the contact portion of the stylus, the setting of the target rotation angle is adequately switched between the setting in which a constant measuring force is produced, that in which the stylus is held while the measuring force is not produced.

When the contact portion reaches the measurement interrupting position of the front measurement execution path, namely, the target rotation angle is switched from the setting in which a constant measuring force is produced, to that in which the stylus is held while the measuring force is not produced. Specifically, the target rotation angle of the stylus is made coincident with the rotation angle which is detected at the measurement interrupting position, and the stylus is held. When the contact portion is positioned and reaches the measurement restarting position of the rear measurement execution path, the setting of the target rotation angle is switched from the setting in which the stylus is held, to that in which the constant measuring force is again produced.

According to the configuration, during a period when the contact portion of the stylus is guided along the positioning patch formed by a cutout (recess) or the like, the stylus can be held at a certain rotation angle while the measuring force is not produced, and the successive measurement path can be continuously subjected to measurement without interrupting execution of a measurement program.

In the measuring force control apparatus according to the embodiment, the target rotation angle issuing portion is configured to set the target rotation angle to a rotation angle of the stylus at which a longitudinal center axis of the stylus is parallel to a center axis of the small-diameter hole, when, in order to measure an inner surface of a small-diameter hole formed in an outer circumference of the object to be measured, the contact portion of the stylus is inserted into the small-diameter hole and positioned to a measurement starting position.

Measurement of Inner Surface of Small-Diameter Hole

In the invention, in the case where the stylus is held, the rotation angle at which the stylus is held can be changed. Furthermore, based on the shape data of a small-diameter hole of the object to be measured, information of the relative position of the object to be measured and the stylus holder, and information of the current rotation angle of the stylus, it is possible to obtain the angle formed by the center axis of the small-diameter hole and the longitudinal center axis of the stylus. In the case where the inner surface of the small-diameter hole formed in the outer circumference of the object to be measured is to be measured, therefore, the longitudinal center axis of the stylus can be made parallel to the center axis of the small-diameter hole, simply by changing the setting of the target rotation angle of the stylus in accordance with the angle formed by the center axis of the small-diameter hole and the longitudinal center axis of the stylus, and operations of inserting the contact portion of the stylus into the small-diameter hole, and feeding the stylus to the measurement starting position can be automatically performed by the measurement program.

As described above, according to the measuring force control apparatus of the invention, first, a successive measurement path including a positioning path such as a cutout (recess) can be subjected to continuous measurement without interrupting execution of the measurement program. Second, the rotation angle at which the stylus is held in the state where the stylus is not contacted with the object to be measured can be arbitrarily changed. Third, the measuring force can be changed in accordance with a change of the measurement conditions. In a successive measurement path, furthermore, the setting of the rotation angle at which the stylus is held, and the setting of the measuring force can be automatically changed.

DETAILED DESCRIPTION

Hereinafter, a preferred embodiment of the invention will be described with reference to the drawings.

Figure 1:
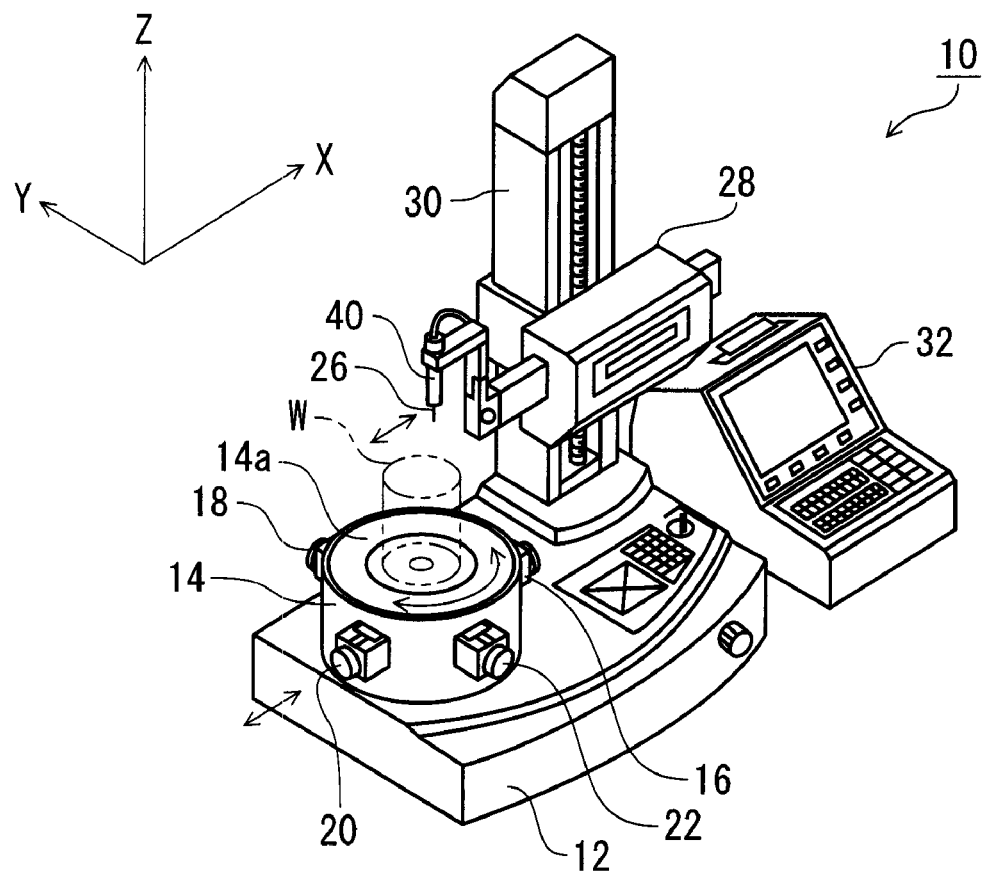
FIG. 1 is a view explaining a schematic structure of a roundness measuring apparatus according to an embodiment of the invention.

FIG. 1 is an external view of a roundness measuring apparatus according to an embodiment of the invention. Referring to the figure, the roundness measuring apparatus 10 includes: a base platform 12; a rotary table 14 which is rotatably disposed on the base platform 12; a position adjusting module 16 for adjusting the X-direction position of the rotary table 14; a position adjusting module 18 for adjusting the Y-direction position of the rotary table; an inclination adjusting module 20 for adjusting the X-direction inclination of a placement surface; an inclination adjusting module 22 for adjusting the Y-direction inclination of the placement surface; a stylus 26 functioning as a detecting module which can detect the surface position of an object to be measured W placed on the rotary table 14; a X-axis stylus moving module 28 which can move in the X-axis direction the stylus 26 together with a stylus holder 40; and a Z-axis stylus moving module 30 which can move in the Z-axis (vertical) direction the stylus 26 together with the stylus moving module 28. The rotary table 14, the position adjusting module 16, 18, the inclination adjusting module 20, 22, the X-axis stylus moving module 28, and the Z-axis stylus moving module 30 constitute the relative moving module in the invention, and can relatively move the object to be measured W and the stylus holder 40.

The rotation amount of the rotary table 14, the movement distance of the placement surface 14a in the X-Y plane, the inclination amount of the placement surface 14a with respect to the X-Y plane, the movement distance of the stylus caused by the stylus moving module 28, 30, the inclination angle displacement of the stylus are sent to a control device 32 which incorporates a microcomputer (CPU). Based on the sent detection values, the control device 32 calculates the relative position of the stylus holder 40 with respect to the object to be measured.

Figure 2:
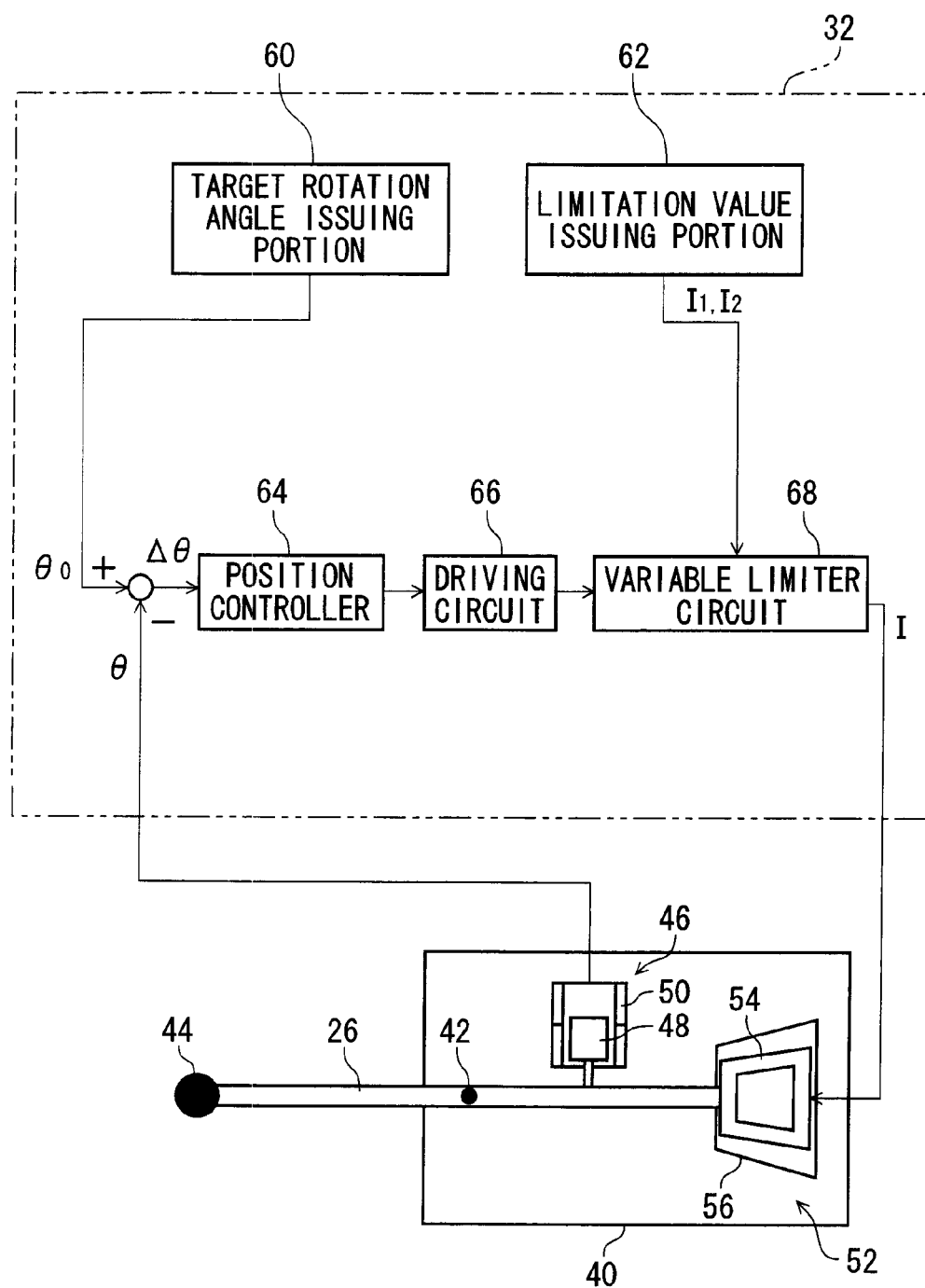
FIG. 2 is a view explaining an overall structure of a measuring force control mechanism used in the apparatus as shown in FIG. 1.

In the embodiment, as shown in FIG. 2, the stylus 26 is rotatably supported by the stylus holder 40 while setting a fulcrum member 42 as a fulcrum. A contact portion (spherical portion) 44 which is to be contacted with the object to be measured is disposed in the tip end of the stylus 26. A voice coil motor 52 functioning as an electromagnetic driving module is disposed in the basal end of the stylus 26, and housed in the stylus holder 40 together with a differential transformer 46 functioning as a rotation angle detecting module for detecting the rotation angle θ of the stylus 26.

Figure 3:
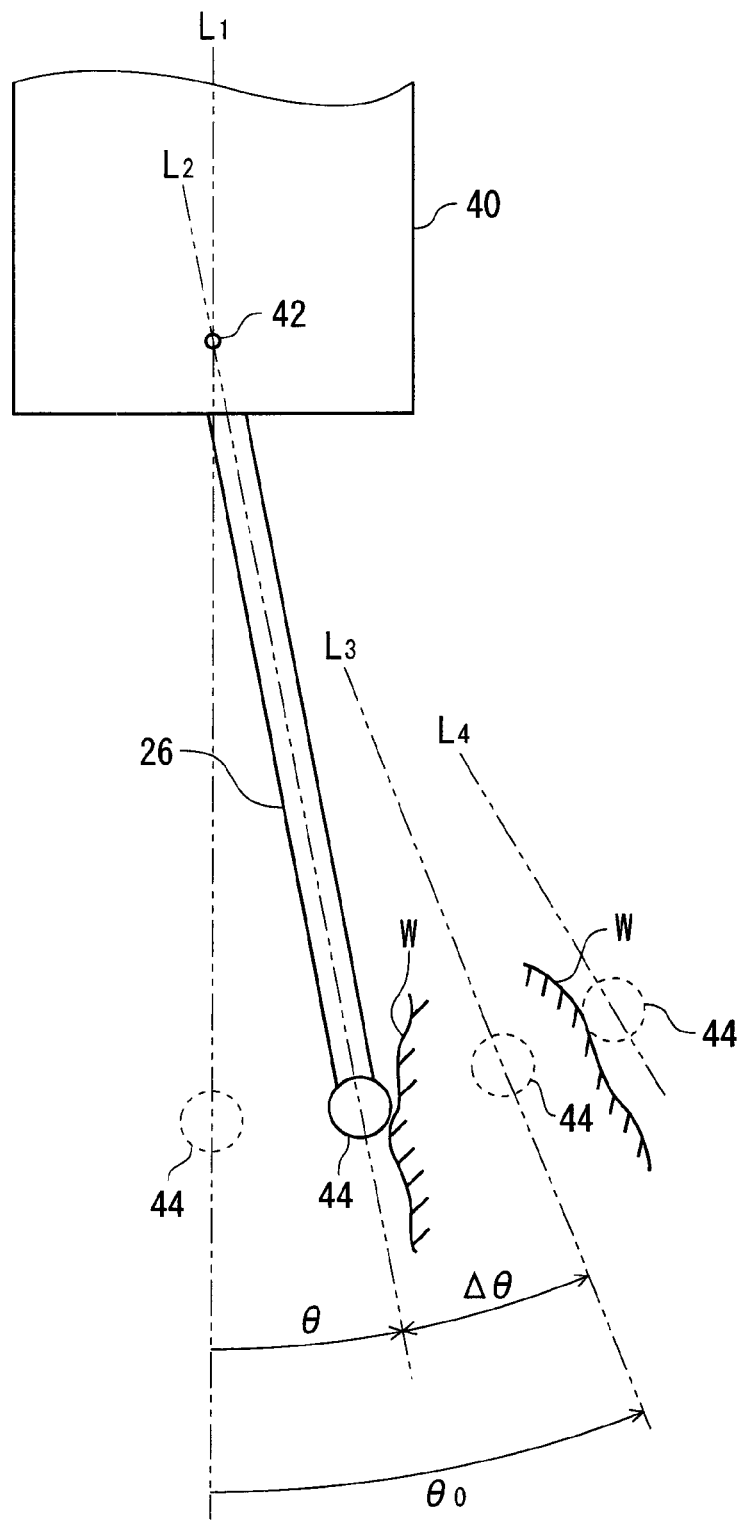
FIG. 3 is a view explaining a positional relationship between a contact stylus and an object to be measured according to the invention.

A core 48 of the differential transformer is formed at a position of the stylus 26 which is on the side of the voice coil motor 52 with respect to the fulcrum, and moved in a coil 50 of the differential transformer in accordance with a rotation operation of the stylus 26. The coil 50 of the differential transformer is fixed to the stylus holder 40. As shown in FIG. 3, for example, the rotation angle θ of the stylus 26 which is detected by the differential transformer 46 may be set as an angle from a reference axis L1. The axes L1 to L4 in FIG. 3 indicate the longitudinal center axes of the stylus 26 in rotation positions of the stylus 26, respectively. In the embodiment, the reference axis L1 of the stylus 26 in detection of the differential transformer 46 is parallel to the center axis of the stylus holder 40.

The voice coil motor 52 of FIG. 2 is configured by a voice coil 54, planar magnets 56, and a magnet holder (yoke) which is not shown, and identical with a motor which is usually used in a hard disk drive or the like. The voice coil 54 is fixed to the basal end of the stylus 26, and swings about the fulcrum of the stylus 26. The pair of planar magnets 56 are fixed to the stylus holder 40 so as to interpose the swinging voice coil 54 therebetween.

When the voice coil 54 is energized, a rotation force about the fulcrum of the stylus 26 acts on the voice coil 54 in accordance with the current amount. The rotation force which is applied to the voice coil 54 is proportional to the strength of the magnetic field generated in the voice coil 54. This allows the voice coil motor 52 to apply the rotation force about the fulcrum to the stylus 26.

The voice coil motor 52 may be a motor of the type that includes a cylindrical coil bobbin around which a coil is wound, a columnar inner yoke, a cylindrical outer yoke, and a magnet fixed to the outer yoke, and that is configured by inserting the coil which is wound around the bobbin between the inner yoke and the outer yoke.

The electromagnetic driving module in the invention may not be a motor in which a movable portion is linearly moved as in the voice coil motor 52. For example, a rotary electromagnetic motor may be directly coupled to the rotation shaft of the stylus to rotate the stylus. Motors of various types can be used as the electromagnetic driving module as far as the rotation force can be applied to the stylus.

As shown in FIG. 2, the control device 32 corresponds to the controlling module in the invention, has a function of controlling the driving current I of the voice coil motor 52, and is configured by a target rotation angle issuing portion 60, a limitation value issuing portion 62, a position controller 64 functioning as an energization amount determining portion, a driving circuit 66, and a variable limiter circuit 68 functioning as an energization amount limiting portion.

The target rotation angle issuing portion 60 sets a target rotation angle $\theta_0$ of the stylus 26, issues the target rotation angle to the position controller 64, and, as required, switches over the setting of the target rotation angle $\theta_0$. The target rotation angle $\theta_0$ is set by the angle formed by the reference axis L1 and the axis L3 in FIG. 3. The axis L3 indicates the center axis of the stylus 26 in the case where the contact portion 44 of the stylus 26 reaches the target position.

The limitation value issuing portion 62 arbitrarily sets the limitation value for setting the driving current I of the voice coil motor 52 constant, and issues the set limitation value to the variable limiter circuit 68. As the limitation value, a positive limitation value $I_1$ and a negative limitation value $I_2$ are set.

The position controller 64 obtains the difference $\Delta\theta$ between the detected rotation angle $\theta$ of the stylus and the target rotation angle $\theta_0$, and determines the energization amount of the voice coil motor 52 so that the difference $\Delta\theta$ becomes zero. The difference $\Delta\theta$ is defined by $\Delta\theta=\theta_0-\theta$, and set by the angle formed by the axes L2, L3 of FIG. 3. The axes L2 indicates the center axis of the stylus 26 in a state where the contact portion 44 of the stylus 26 is in contact with the object to be measured W. For the sake of convenience, it is assumed that, when $\theta_0$ is larger than $\theta$, the difference $\Delta\theta$ is a positive value. If the rotation angle $\theta$ of the stylus becomes larger than the target rotation angle $\theta_0$ and the stylus rotates to the position of the axis L4, the difference $\Delta\theta$ becomes a negative value.

When the voice coil motor 52 operates based on the energization amount which is determined in the position controller 64, the stylus 26 is subjected to the rotation force in the direction in which the difference $\Delta\theta$ is decreased.

The driving circuit 66 outputs a driving current which is to be actually supplied to the voice coil motor 52, based on the energization amount which is determined in the position controller 64.

When the difference $\Delta\theta$ is equal to or larger than a certain angle, the variable limiter circuit 68 limits the driving current I which is supplied from the driving circuit, to the limitation value. Alternatively, when the difference $\Delta\theta$ is equal to or larger than a certain angle, the variable limiter circuit may limit the energization amount which is determined in the position controller 64, to a limitation value. In this case, the driving circuit 66 supplies the driving current I based on the limited energization amount, to the voice coil motor 52.

Figure 4:
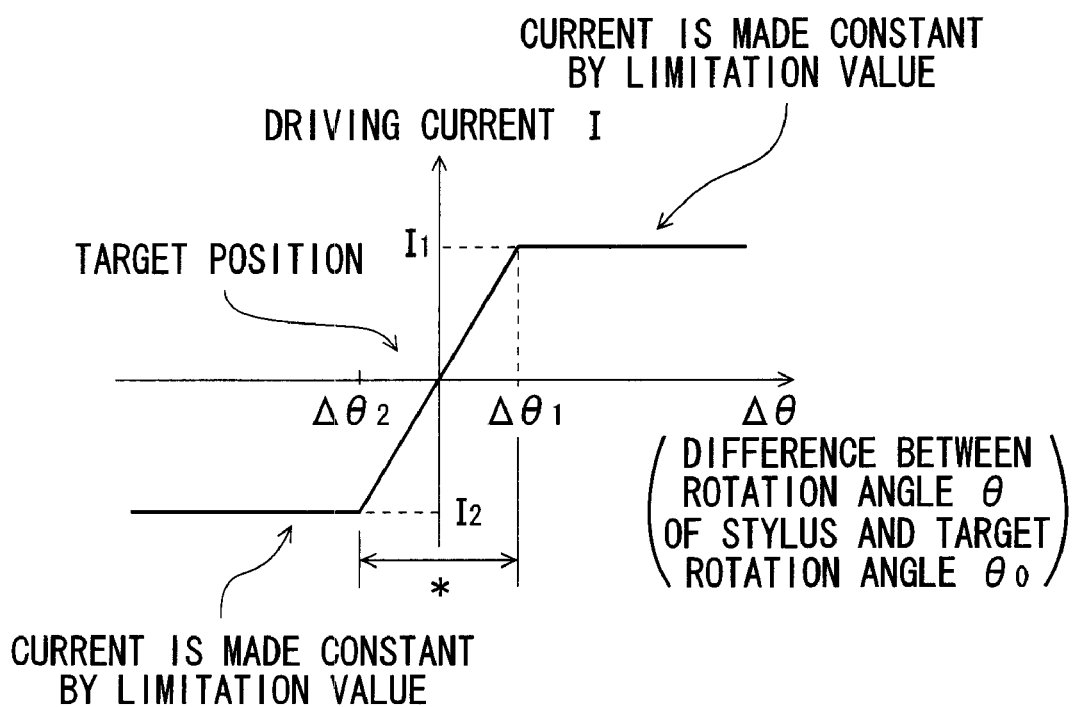
FIG. 4 is a graph showing a relationship between a difference of a rotation angle of a stylus and a target rotation angle and a driving current to an electromagnetic driving module.

FIG. 4 is a graph in which the abscissa indicates the difference $\Delta\theta$ and the ordinate indicates the driving current I, and which shows a relationship between the difference $\Delta\theta$ and the driving current I. In the range where the difference $\Delta\theta$ is equal to or larger than a certain angle $\Delta\theta_1$, the constant driving current I which is limited to the limitation value $I_1$ is flown to the voice coil motor 52, and a constant measuring force $F_1$ is produced.

When the difference $\Delta\theta$ is a negative value, in the range where the difference $\Delta\theta$ is equal to or smaller than a certain angle $\Delta\theta_2$, the constant driving current I which is limited to the limitation value $I_2$ is flown to the voice coil motor 52, and a constant measuring force $F_2$ which is opposite in direction to the measuring force $F_1$ is produced.

When the difference $\Delta\theta$ is in the range (indicated by the asterisk in the figure) where the difference exceeds the certain angle $\Delta\theta_2$ and is equal to or smaller than the certain angle $\Delta\theta_1$, the driving current I which is proportional to the difference $\Delta\theta$ is flown to the voice coil motor 52. The position controller 64 is provided with characteristics so that the certain angles $\Delta\theta_1$, $\Delta\theta_2$ are as small as possible, or the time periods required for the difference $\Delta\theta$ to increase from zero to the certain angles $\Delta\theta_1$, $\Delta\theta_2$ are as short as possible. Furthermore, the position controller 64 is provided with characteristics so that vibrations do not occur in the stylus.

Figure 5:
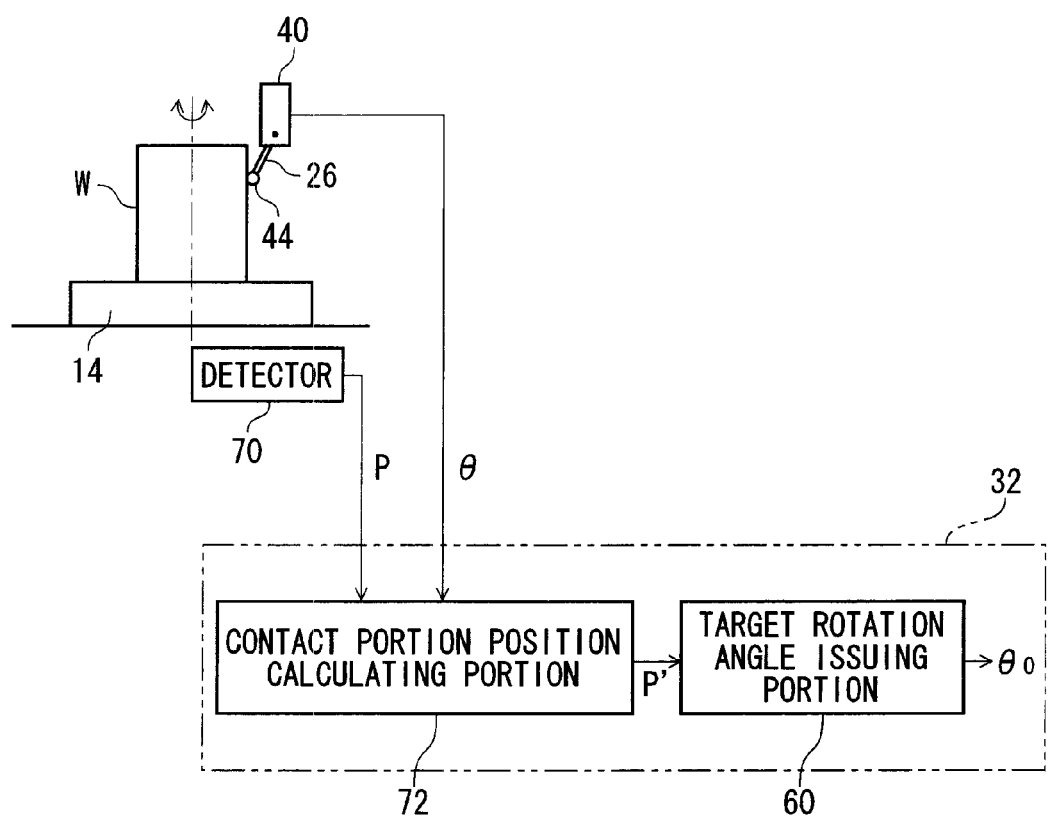
FIG. 5 is a view explaining a partial structure of a measuring force control mechanism used for the apparatus as shown in FIG. 1.

As shown in FIG. 5, the relative position P of the stylus holder 40 with respect to the object to be measured W is detected by detectors (relative position detecting module) 70 which are disposed in various driving mechanisms such as the rotary table 14 and the X-axis stylus moving module 28. In the control device 32, disposed is a contact portion position calculating portion 72 which calculates the relative position P' of the contact portion 44 of the stylus with respect to the object to be measured W, on the basis of the detected relative position P and the rotation angle $\theta$ of the stylus. The calculated relative position P' is sent to the target rotation angle issuing portion 60 for the stylus. The target rotation angle issuing portion 60 collates information of the relative position P' of the contact portion 44 of the stylus with previously input shape data of the object to be measured W, and sets the target rotation angle $\theta_0$ of the stylus 26 corresponding to the relative position P' of the contact portion 44 of the stylus.

A feature of the invention is that the measuring force F which is caused to acts on the surface of the object to be measured by an operation in which the contact portion 44 of the stylus 26 is pressed against the object to be measured W by the rotation force of the voice coil motor 52 is controlled by, as required, switching over the setting of the target rotation angle $\theta_0$ that is set by the target rotation angle issuing portion 60 shown in FIG. 2.

Specifically, in the case where the constant measuring force F is to be produced, the target rotation angle issuing portion 60 sets the target rotation angle $\theta_0$ within the range where the difference $\Delta\theta$ between the detected rotation angle $\theta$ of the stylus and the target rotation angle $\theta_0$ is equal to or larger than the certain angle $\Delta\theta_1$ (FIG. 4). In the case where the difference $\Delta\theta$ is a negative value, the target rotation angle $\theta_0$ is set within the range where the difference $\Delta\theta$ is equal to or smaller than the certain angle $\Delta\theta_2$ (FIG. 4). In the case where the stylus 26 is held while the measuring force F is not produced, the target rotation angle $\theta_0$ is set within the range where the stylus 26 is not subjected to rotation restriction caused by the contact between the object to be measured W and the contact portion 44 of the stylus.

The embodiment will be described in detail with reference to FIGS. 6 to 10.

Figure 6:
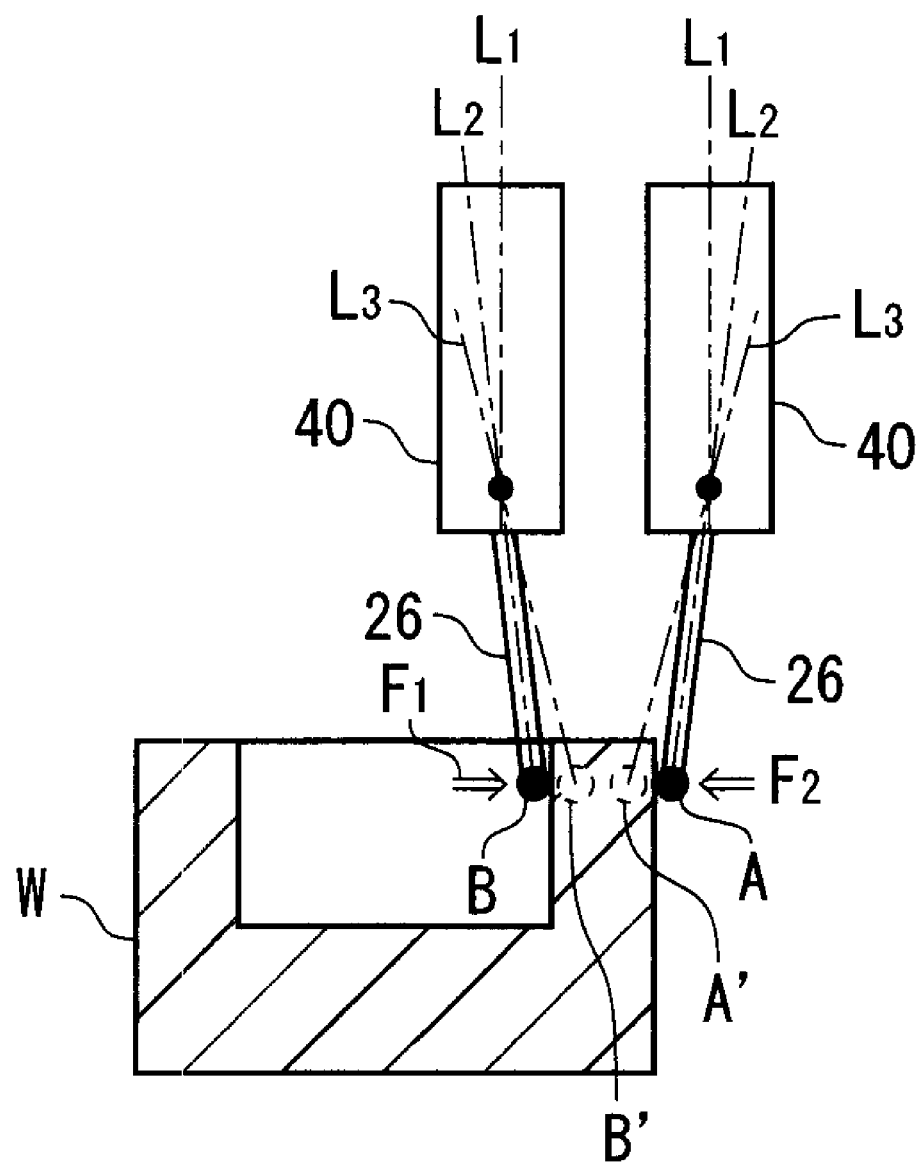
FIG. 6 is a view explaining a state where a cylindrical object to be measured is measured by using the roundness measuring apparatus of the invention.

FIG. 6 schematically shows a state where the outer and inner circumferences of a cylindrical object to be measured W which is upward opened are measured by using the roundness measuring apparatus 10 of the embodiment.

In the measurements of the outer and inner circumferences, as seen from the figure, the target rotation angle $\theta_0$ of the stylus 26 is set within the range where the stylus 26 is actually subjected to rotation restriction by the object to be measured W. Namely, the target positions (the positions A', B' in the figure) of the contact portion of the stylus 26 are set at positions which are further inside the object to be measured W with respect to actual measurement positions (the positions A, B in the figure). In the measurement of the outer circumference, furthermore, the target rotation angle $\theta_0$ is set within the range (FIG. 4) where the difference $\Delta\theta$ between the detected rotation angle $\theta$ of the stylus and the target rotation angle $\theta_0$ is equal to or smaller than the certain angle $\Delta\theta_2$. Therefore, the constant driving current I which is limited by the limitation value $I_2$ based on the graph of FIG. 4 is flown to the voice coil motor 52. thereby enabling the constant measuring force $F_2$ which is in the clockwise direction, to be produced about the fulcrum of the stylus 26. In the measurement of the inner circumference, similarly, the target rotation angle $\theta_0$ is set within the range (FIG. 4) where the difference $\Delta\theta$ between the detected rotation angle $\theta$ of the stylus and the target rotation angle $\theta_0$ is equal to or larger than the certain angle $\Delta\theta_1$. Therefore, the constant driving current I which is limited by the limitation value $I_1$ based on the graph of FIG. 4 is flown to the voice coil motor, thereby enabling the constant measuring force $F_1$ which is in the counterclockwise direction, to be produced about the fulcrum.

Moreover, the limitation value issuing portion 62 can arbitrarily set the limitation value $I_1$ or $I_2$, and hence the measuring force F can be changed simply by changing the setting of the limitation value.

Figure 7A:
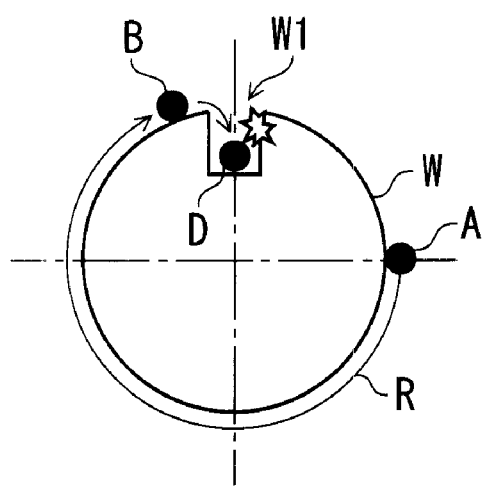
FIGS. 7A and 7B are views explaining a state where an object to be measured having a cutout portion is measured by using the roundness measuring apparatus of the invention.
Figure 7B:
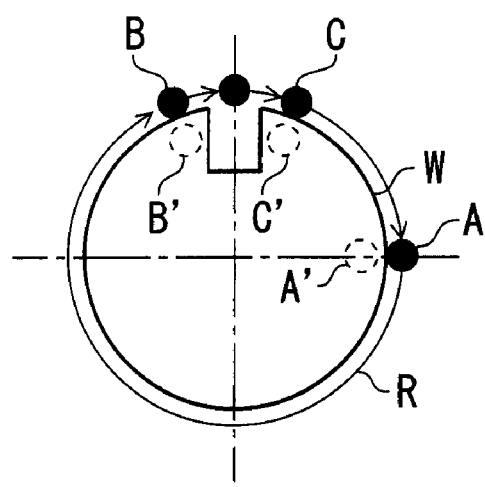

FIGS. 7A and 7B schematically show a state where a columnar object to be measured W having a cutout portion W1 in the outer circumferential face is measured by using the roundness measuring apparatus 10 of the embodiment.

The contact portion (indicated by the small circle in the figures) of the stylus 26 is guided along a successive measurement path R which is previously set in the outer circumferential face of a column. However, the successive measurement path R includes in the middle the cutout portion W1 in which, in the relate art, the measurement must be interrupted, and the contact portion of the stylus 26 must be positioned to the next measurement restarting position. In the related-art roundness measurement, in the case where the successive measurement path R is subjected to continuous measurement without interrupting execution of the measurement, when the stylus 26 which is urged toward the object to be measured by the measuring force F reaches the cutout portion W1, the contact portion of the stylus 26 falls down into the cutout portion W1 (the position D in FIG. 7A). When the object to be measured W is further continued to be rotated in this state, the contact portion of the stylus 26 bumps against the wall of the cutout portion W1, whereby the stylus may be broken.

According to the roundness measuring apparatus 10 of the embodiment, in the range from the measurement starting position (the position A in FIG. 7B) to the measurement interrupting position (the position B in the figure) in front of the cutout portion W1, the measurement is executed while, in the same manner as the case of FIG. 6, the target rotation angle $\theta_0$ of the stylus 26 is set by the instructions from the target rotation angle issuing portion 60 so that the target positions of the contact portion of the stylus 26 are positions (for example, the positions A', B' in FIG. 7B) which are inside the object to be measured W, ant the constant measuring force F is produced.

A feature of the invention is that, when the contact portion of the stylus 26 reaches the measurement interrupting position (the position B in the figure) in front of the cutout portion W1, the stylus 26 is held while a state where the measuring force F is zero is set by making the target rotation angle $\theta_0$ of the stylus 26 coincident with the rotation angle $\theta$ of the stylus which is detected at the measurement interrupting position by the instructions from the target rotation angle issuing portion 60, and then an operation of positioning to the next measurement restarting position (the position C in the figure) is performed. This can prevent the contact portion of the stylus 26 from falling down into the cutout portion W1, and it is not required to interrupt execution of the measurement program. In this embodiment, the target rotation angle issuing portion sets the target rotation angle to coincide with the rotation angle of the stylus which is detected at a measurement interrupting position; however, the target rotation angle can be set to coincide with a value which is stable and most appropriate for restarting of the measurement of the next measurement executing path.

When the contact portion of the stylus 26 passes the cutout portion W1 and positioning to the measurement restarting position (the position C) in the next measurement execution path is ended, the target rotation angle issuing portion 60 again switches the setting of the target rotation angle $\theta_0$ to that (the position C' in the figure) in which the constant measuring force F is produced, and the measurement is automatically restarted.

FIGS. 8A to 8D schematically show a state where the inner surface of a small-diameter hole is measured by using the roundness measuring apparatus 10 of the embodiment.

Figure 8A:
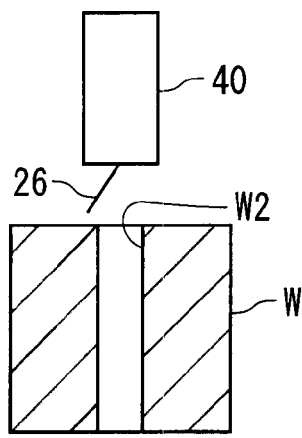
FIGS. 8A to 8D are views explaining a state where an object to be measured having a small-diameter hole is measured by using the roundness measuring apparatus of the invention.
Figure 8B:
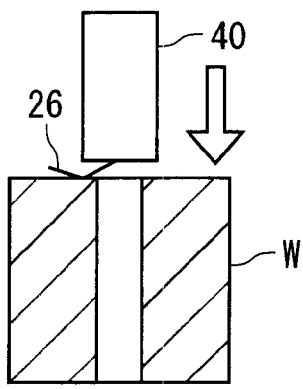

In the case where the contact portion of the stylus 26 is to be positioned to a measurement starting position of the inner surface W2, when the contact portion approaches the small-diameter hole in a state where the rotation angle $\theta$ of the stylus is set to be large, the tip end of the stylus 26 does not reach the small-diameter hole even when the stylus holder 40 is positioned immediately above the small-diameter hole, as apparent from FIG. 8A. When the stylus holder 40 in this state is lowered, the stylus 26 may be broken as shown in FIG. 8B.

Figure 8C:
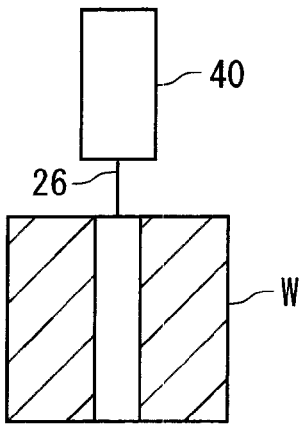
Figure 8D:
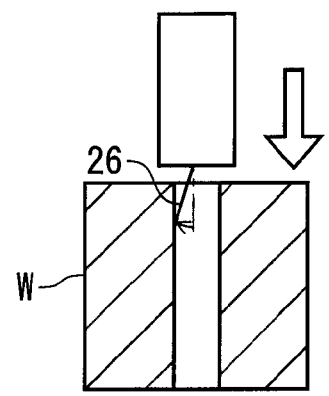

In the embodiment, therefore, the measurement is performed in the following manner. When the stylus holder 40 reaches immediately above the small-diameter hole, the target rotation angle $\theta_0$ is changed as shown in FIG. 8C, and the rotation angle $\theta$ of the stylus 26 is reduced so that the longitudinal center axis of the stylus 26 is parallel to the center axis of the small-diameter hole. As a result, the contact portion of the stylus 26 enters the range of the small-diameter hole, and can be lowered as it is (FIG. 8D). When the contact portion of the stylus 26 reaches the measurement starting position, the setting of the target rotation angle $\theta_0$ of the stylus 26 is switched to that in which the constant measuring force F is produced, and then the roundness of the inner surface of the small-diameter hole can be measured by using the constant measuring force F.

In FIGS. 8A to 8D, when the set value of the target rotation angle $\theta_0$ is changed so that the rotation angle $\theta$ at which the stylus is to be held is attained, the rotation angle $\theta$ of the held stylus 26 can be easily changed.

Figure 9:
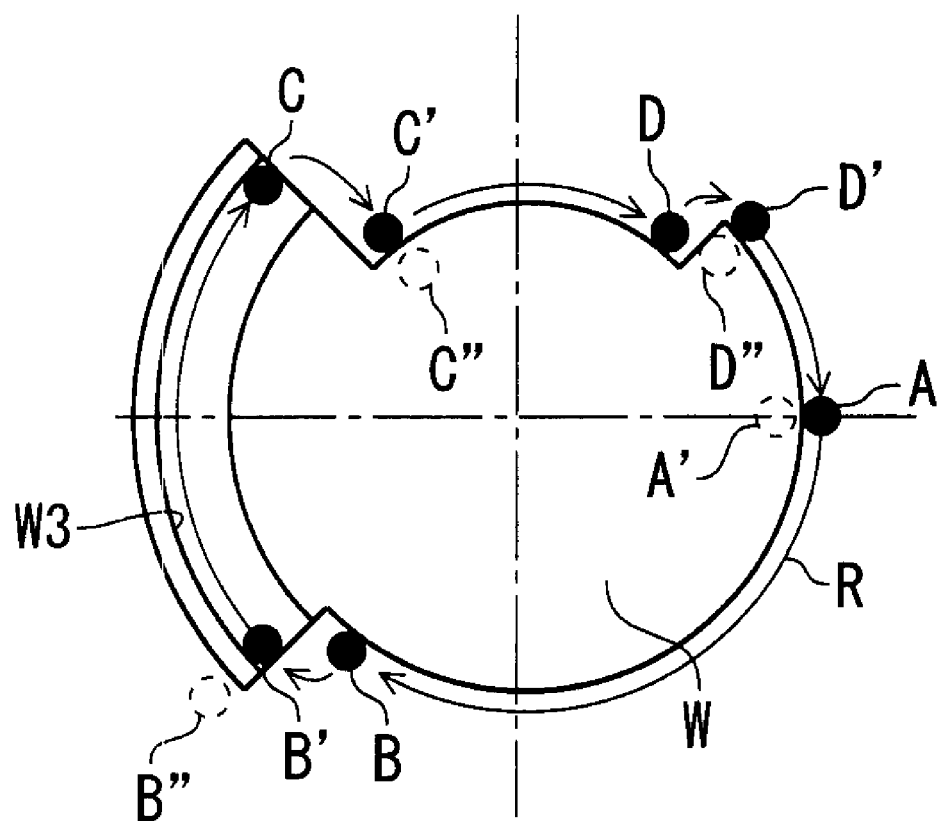
FIG. 9 is a view explaining a state where an object to be measured having a cutout portion and partially an inner circumferential face is measured by using the roundness measuring apparatus of the invention.
Figure 10:
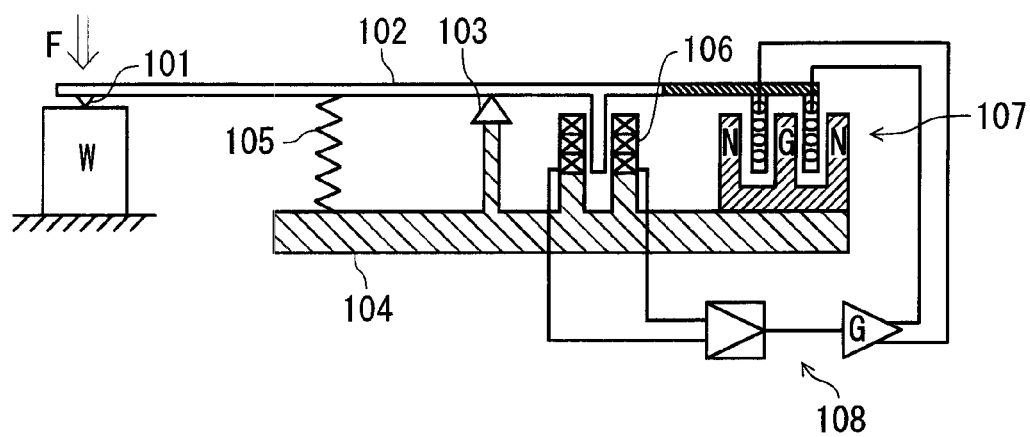
FIG. 10 is a view explaining an overall structure of a related-art measuring force control apparatus.

FIG. 9 schematically shows a state where a columnar object to be measured W having a cutout portion in the outer circumferential face and partially an inner circumferential face W3 is measured by using the roundness measuring apparatus 10 of the embodiment.

During a period when the contact portion of the stylus 26 is guided from the measurement starting position (the position A in FIG. 9) to the measurement interrupting position (the position B in the figure), the target rotation angle $\theta_0$ is made in the setting (for example, the position A') in which the constant measuring force F is produced. At the measurement interrupting position B, the target rotation angle $\theta_0$ is switched to the setting in which the stylus 26 is held. Then, the contact portion of the stylus 26 is positioned from the measurement interrupting position B to the measurement restarting position (the position B'). At the measurement restarting position B', the target rotation angle $\theta_0$ is made in the setting (the position B") in which the constant measuring force F is produced. During a period when the contact portion of the stylus 26 is guided from the position B' to the next measurement interrupting position (the position C), therefore, the constant measuring force F which is directed toward the inner circumferential face W3 is produced. When the contact portion of the stylus 26 reaches the position C, the target rotation angle $\theta_0$ is switched to the setting in which the stylus 26 is held, and the contact portion of the stylus 26 is positioned to the next measurement restarting position (the position C'). At the measurement restarting position C', the target rotation angle $\theta_0$ is made in the setting (the position C") in which the constant measuring force F is produced. When the contact portion of the stylus 26 reaches the next measurement interrupting position (the position D), the target rotation angle $\theta_0$ is switched to the setting in which the stylus 26 is held, and the contact portion of the stylus 26 is positioned to the next measurement restarting position (the position D'). At the measurement restarting position D', the target rotation angle $\theta_0$ is made in the setting (the position D" in the figure) in which the constant measuring force F is produced.

As described above, the successive measurement path R extending to the measurement completing position (the position A) can be subjected to continuous measurement without stopping execution of the measurement program.

In the embodiment, the shape data of the object to be measured W are previously incorporated into the measurement program. The set value of the target rotation angle $\theta_0$ is set while leaving a margin, so that, even when the stylus 26 is displaced by a degree which is equal to or larger than the variation range that is expected in the roundness measurement, the constant measuring force F can be produced.

The roundness measuring apparatus is an example of the measuring force control apparatus of the invention. As the measuring force control apparatus, the invention may be applied also to other surface texture measuring apparatuses (such as a contour measuring apparatus and a roughness measuring apparatus).

What is claimed is:

1. A measuring force control apparatus which controls a measuring force that is caused to act on a surface of an object to be measured by pushing the object to be measured with a contact portion of a stylus, comprising:

the stylus having the contact portion at a tip end, the contact portion being to be contacted with the object to be measured;

a stylus holder configured to hold the stylus in a state that the stylus can rotate about a fulcrum member as a fulcrum;

a rotation angle detecting module configured to detect a rotation angle of the stylus;

an electromagnetic driving module configured to apply a rotation force about the fulcrum to the stylus in accordance with an energization amount; and a controlling module configured to control the energization amount which is to be given to the electromagnetic driving module, wherein the controlling module has:

a target rotation angle issuing portion configured to set a target rotation angle of the stylus, an energization amount determining portion configured to obtain a difference between the detected rotation angle of the stylus and the target rotation angle, and to determine the energization amount which is to be given to the electromagnetic driving module so that the difference becomes zero, a limitation value issuing portion configured to set a limitation value for making constant the energization amount which is to be given to the electromagnetic driving module, and an energization amount limiting portion configured to, when the difference between the detected rotation angle of the stylus and the target rotation angle is equal to or larger than a certain angle, limit the energization amount that is determined by the energization amount determining portion, to the limitation value, thereby causing a constant measuring force to be produced.

2. The measuring force control apparatus according to claim 1, wherein in a case where a constant measuring force is to be produced, the target rotation angle issuing portion is configured to set the target rotation angle within a range where the rotation of the stylus is restricted by the contact between a measurement position of a surface of the object to be measured and the contact portion of the stylus, and the difference between the detected rotation angle of the stylus and the target rotation angle is equal to or larger than the certain angle, and in a case where the stylus is to be held while the measuring force is not to be produced, the target rotation angle issuing portion is configured to set the target rotation angle within a range where the stylus is not subjected to rotation restriction caused by the contact between the object to be measured and the contact portion of the stylus.

3. The measuring force control apparatus according to claim 1, further comprising:

a relative moving module configured to relatively move the stylus holder and the object to be measured; and a relative position detecting module configured to detect a relative position of the stylus holder and the object to be measured, wherein the controlling module comprises a contact portion position calculating portion configured to calculate a relative position of the contact portion of the stylus with respect to the object to be measured, on a basis of the detected relative position of the stylus holder and the object to be measured, and the detected rotation angle of the stylus, and, wherein the target rotation angle issuing portion is configured to change a setting of the target rotation angle on a basis of the relative position of the contact portion of the stylus with respect to the object to be measured.

4. The measuring force control apparatus according to claim 3,
wherein
in a case where a successive measurement path is successively measured, the successive measurement path being previously set on an outer circumferential face of the object to be measured and including successively a first measurement executing path in which the measurement is to be executed, a positioning path in which the measurement is to be interrupted and a second measurement executing path in which the measurement is to be executed,
the target rotation angle issuing portion is configured to set the target rotation angle within a range where the difference between the detected rotation angle of the stylus and the target rotation angle is equal to or larger than the certain angle, thereby causing the constant measuring force to be produced, during executing the measurement of the first measurement executing path,
the target rotation angle issuing portion is configured to set the target rotation angle to coincide with the rotation angle of the stylus which is detected at a measurement interrupting position or to coincide with a value which is stable and most appropriate for restarting of the measurement of the second measurement executing path, when the contact portion of the stylus reaches the measurement interrupting position of the first measurement executing path, and,
the target rotation angle issuing portion is configured to set the target rotation angle within the range where the difference between the detected rotation angle of the stylus and the target rotation angle is equal to or larger than the certain angle, when the contact portion of the stylus reaches a measurement restarting position of the second measurement execution path.

5. The measuring force control apparatus according to claim 1, wherein
the target rotation angle issuing portion is configured to set the target rotation angle to a rotation angle of the stylus at which a longitudinal center axis of the stylus is parallel to a center axis of a small-diameter hole formed in an outer circumference of the object to be measured, when, in order to measure an inner surface of the small-diameter hole, the contact portion of the stylus is inserted into the small-diameter hole and positioned to a measurement starting position.

* * * * *